United States Patent [19]

Plowman

[11] Patent Number: 4,755,272
[45] Date of Patent: Jul. 5, 1988

[54] BIPOLAR ELECTROCHEMICAL CELL HAVING NOVEL MEANS FOR ELECTRICALLY CONNECTING ANODE AND CATHODE OF ADJACENT CELL UNITS

[75] Inventor: Keith R. Plowman, Lake Jackson, Tex.

[73] Assignee: The Dow Chemical Company, Midland, Mich.

[21] Appl. No.: 859,177

[22] Filed: May 2, 1986

[51] Int. Cl.$^4$ .................. C25B 9/00; C25B 13/02; C25B 13/08

[52] U.S. Cl. .................... 204/256; 204/279; 204/283; 204/284; 204/296; 204/128; 429/14; 429/39

[58] Field of Search ............ 204/254–256, 204/253, 257–258, 283, 286, 279, 268, 128; 429/38–39, 14, 13

[56] References Cited

U.S. PATENT DOCUMENTS

| | | | |
|---|---|---|---|
| 3,242,059 | 7/1961 | Cottam et al. | 204/98 |
| 3,453,147 | 7/1969 | Griffin, Jr. | 429/13 |
| 3,692,585 | 9/1972 | Mayo | 429/39 X |
| 3,902,916 | 9/1975 | Warszawski | 429/39 |
| 4,169,917 | 10/1979 | Baker et al. | 429/39 X |
| 4,187,165 | 2/1980 | Appleby et al. | 204/268 X |
| 4,271,003 | 6/1981 | Lindstrom | 204/265 |
| 4,279,731 | 7/1981 | Pellegri | 204/254 |
| 4,486,276 | 12/1984 | Cohn et al. | 204/98 |
| 4,526,663 | 7/1985 | Yoshida et al. | 204/283 X |
| 4,592,822 | 6/1986 | deNora | 204/283 X |
| 4,605,482 | 8/1986 | Shiragami et al. | 204/283 X |
| 4,639,303 | 1/1987 | Staab et al. | 204/258 |

Primary Examiner—Donald R. Valentine
Attorney, Agent, or Firm—Andrew E. Pierce

[57] ABSTRACT

A bipolar electrochemical cell comprising a novel connector for electrically connecting the anode and cathode of adjacent cell units comprising a corrugated, electrically conductive sheet which defines, respectively, with said cathode and said anode, separate channels for feeding gases or a gas and an electrolyte to said electrodes and a spacer placed between the cell separator and one of the electrodes which is adapted to provide, upon compression of a cell stack, dimensional separation of the cell separator and the electrode as well as electrical contact with the electrodes of the bipolar cell connector.

17 Claims, 1 Drawing Sheet

BIPOLAR ELECTROCHEMICAL CELL HAVING NOVEL MEANS FOR ELECTRICALLY CONNECTING ANODE AND CATHODE OF ADJACENT CELL UNITS

BACKGROUND OF THE INVENTION (1) Field of the Invention

This invention relates to a bipolar electrochemical cell such as a fuel cell or an electrolytic cell, for instance a chlor-alkali electrolytic cell utilizing an oxygen containing gas depolarized cathode.

(2) Description of the Prior Art

Electrochemical cells containing electrodes separated by a permselective membrane, wherein at least one electrode is a gas diffusion electrode and said cell has means for the supply and discharge of an electrochemically active substance in the gaseous state, are well known in the art. Gas diffusion electrodes are used in many electrochemical power sources, for instance metal air cells, methanol air cells, and other types of fuel cells. Ordinarily, one side of the gas diffusion electrode is in contact with a gas phase (for instance the air space in a metal air cell or the hydrogen space in a hydrogen air cell) and the other side is exposed to an electrolyte phase. In bipolar cells, an electrical contact is provided between the electrodes in adjacent units of the bipolar electrochemical cell. In the prior art it has been difficult to provide durable electrical connections between a gas diffusion electrode of one unit of a bipolar cell and the electrode of an adjacent unit of a bipolar cell.

The term gas diffusion or gas depolarized electrode generally refers to a complete electrode in the sense that the electrode is capable of functioning so as to provide a reaction site for a combination of a gaseous substance supplied to one side of the electrode and an electrolyte supplied to the opposite side of the electrode, the reaction taking place within the electrode. Gas diffusion electrodes are generally porous to a gas phase on one side of the electrode and porous to a liquid electrolyte phase on the opposite side of the electrode.

Gas diffusion electrodes for use in electrochemical cells are disclosed in U.S. Pat. No. 4,486,276 wherein an oxygen containing gas is disclosed as contacting a gas diffusion cathode in an electrochemical cell for the electrolysis of an alkali metal chloride. The gas diffusion cathode is fed an oxygen containing gas to eliminate the formation of hydrogen at the cathode during the electrolysis. Gas diffusion electrodes are also disclosed in U.S. Pat. No. 4,271,003.

A bipolar electrolytic cell is disclosed in U.S. Pat. No. 4,279,731 wherein the anode and cathode of said electrolytic cell are separated by a series of baffles distributed along the entire width of the electrode compartment. Said baffles are inclined alternately in different directions with respect to the vertical plane normal to the surface of the cell separator and electrode and define a substantially vertical flow channel for the electrolyte. The electrodes disclosed can be composed of particulate materials which are bonded utilizing a bonding agent but there is no indication that such electrodes are gas diffusion or gas depolarized electrodes.

In U.S. Pat. No. 3,242,059 a process is disclosed for the production of chlorine and caustic soda in a bipolar electrolysis cell wherein neighboring cells are spaced apart by corrugated titanium sheets which also act as current connections between the adjacent cell units of the bipolar electrolytic cell. The corrugated titanium sheets provide anode compartments and cathode compartments in connection with the anode and cathode of adjacent electrolytic cell units. Thus opposite sides of each corrugated sheet define, with the electrodes, compartments for the anolyte and the catholyte liquids of the cell. The anodes and cathodes are of titanium coated with platinum.

In none of these references is the novel electrical connector for a bipolar electrolytic cell disclosed wherein said bipolar cell unit has at least one gas diffusion or gas depolarized electrode. A novel electrochemical cell is disclosed herein containing an interspace between positive and negative electrodes. The interspace is divided by said novel connector so as to serve as both a gas space and an electrolyte space.

SUMMARY OF THE INVENTION

The bipolar electrolytic cell of the invention incorporates a novel method of electrically connecting adjacent units of a bipolar cell wherein said bipolar cell has at least one electrode characterized as a gas diffusion or gas depolarized electrode. The means of electrically connecting the bipolar cell units together with the electrodes, the cell separator, and the spacing means used in the cell constitute what is termed the bipolar assembly of the invention. The connecting means consists of a conductive means such as a corrugated metal or graphite sheet which is adapted for electrically contacting both the anode and the cathode of adjacent electrochemical cell units of the bipolar cell of the invention so as to provide an electrical connection between said cell units. The connecting means also forms a fist series of channels in conjunction with the cathode of a cell unit and forms a second series of channels in conjunction with the adjacent anode.

In an electrochemical cell characterized as a fuel cell, an oxidizing gas is fed to one side of the cathode in said first series of channels and a fuel gas is fed to one side of the anode utilizing said second series of channels. In an electrolytic cell such as a chlor-alkali electrolytic cell for the electrolysis of an alkali metal halide to produce an aqueous solution of an alkali metal hydroxide i.e., sodium hydroxide and a halogen gas, i.e., chlorine gas, the first series of channels formed in conjunction with a gas diffusion cathode is utilized to feed a depolarizing gas such as air or other oxygen containing gas to the cathode. The second series of channels is utilized in conjunction with a foraminous anode, preferably a dimensionally stable anode, as a means of feeding an anolyte liquid such as an alkali metal halide to the anode and also as a means of withdrawing a halogen gas formed at the anode. In the bipolar electrochemical cell of the invention a cell separator, for instance, a cation permselective membrane and a non-conductive spacer are used between the side of the gas depolarized cathode which is exposed to electrolyte and the anode of the adjacent cell unit. The spacer can be a series of elongated individual rod shaped members with the elongated dimension of the rods aligned at an angle of greater than about 10° to the line formed by the ridge of the corrugated connecting means. The rods can also be an integral assembly. The spacer members provide pressure points at the intersections of the lines formed by the spacer members with the lines formed by the corrugation ridges of the connecting means. Cell compression is needed for good electrical contact within each cell unit. It should be noted that the major dimension of the electrodes and the channels formed by the corrugated metal or graphite sheet are preferably aligned substantially vertically where it is desirable that the gas formed at the anode is to be collected at the surface of the electrolyte. In an electrochemical cell such as a fuel cell the channels and the major dimension of the electrodes can be arranged either vertically or horizontally since both channels are utilized to feed gas to the gas diffusion electrodes of the electrochemical cell.

DETAILED DESCRIPTION OF THE INVENTION

Figure 1:
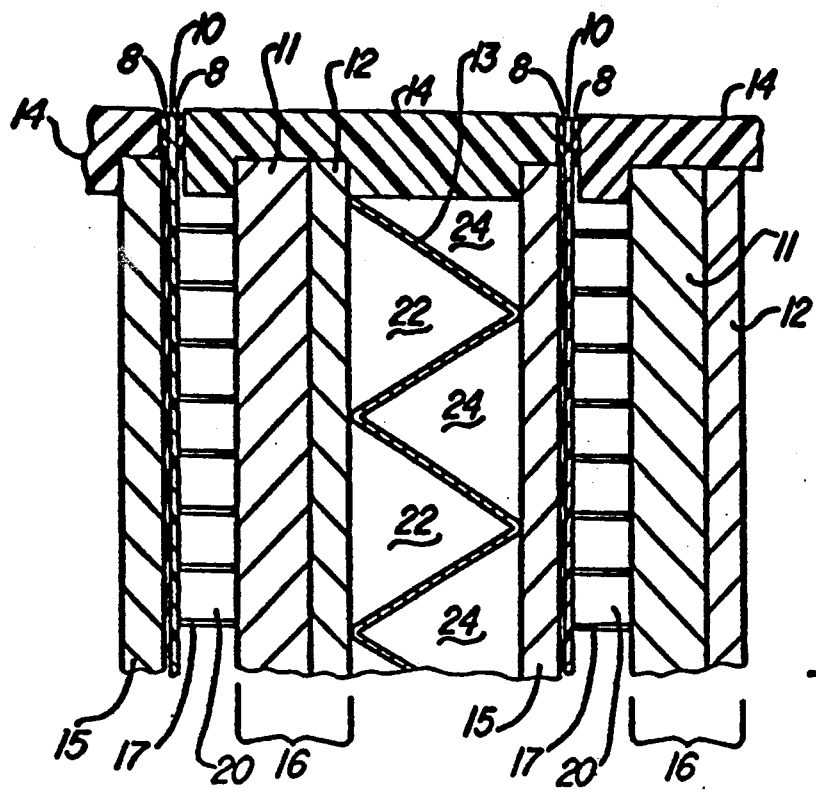
FIG. 1 is a schematic view of part of a bipolar cell having a metal anode according to a preferred embodiment of the invention.

Referring to FIG. 1, there is illustrated schematically a portion of a bipolar electrochemical cell according to the invention showing a portion of one unit of a preferred embodiment of said cell and the relationship of said unit to portions of two other cells of said bipolar electrochemical cell. There is shown a cell body 14 at either end of which a permselective membrane 10 is held in position between two gaskets 8 so as to provide a fluid tight seal between adjacent cell bodies of the bipolar cell. Cathode 16 and anode 15 are connected electrically by a corrugated, electrically conductive sheet 13 which also serves to define two series of channels; a first series of channels 22 formed by the corrugated metal sheet 13 in conjunction with gas depolarized cathode 16, having an electrolyte active hydrophilic layer 11 and a hydrophobic conductive backing layer 12 and a second series of channels 24 provides the anode compartment formed by the corrugated sheet 13 in conjunction with the anode 15 which can be a foraminous dimensionally stable metal anode or a gas diffusion anode. Between the gas diffusion cathode 16 and the permselective membrane 10 there is cell spacer 17 shown as a series of rod shaped members, which function to support the gas diffusion cathode 16 and maintain a desired spatial relationship of cathode 16 with permselective membrane 10. Located between said cathode 16 and said permselective membrane is catholyte compartment 20 which is occupied by the cell spacer 17. Electrolyte feed and withdrawal sites in the cell unit are not shown in the drawing since these are normally located at the top and bottom of the cell unit.

In another embodiment of the invention, not shown, the bipolar cell of the invention can be utilized for the production of an aqueous solution of sodium hydroxide and chlorine. For use in producing these products, the channels formed between the cathode and the anode by the corrugated metal or graphite sheet are oriented vertically and in the direction of the major dimension of the electrodes of the cell. This allows the chlorine gas to escape upwardly as it is produced at the foraminous anode. The use of the bipolar cell of the invention in an electrochemical cell characterized as a fuel cell permits the positioning of the corrugations in the corrugated metal sheet in the horizontal or in any plane between the horizontal and vertical planes since in a fuel cell, the channels formed by the corrugated metal sheet are useful merely for feeding gas to the gas diffusion electrodes of the cell.

Figure 2:
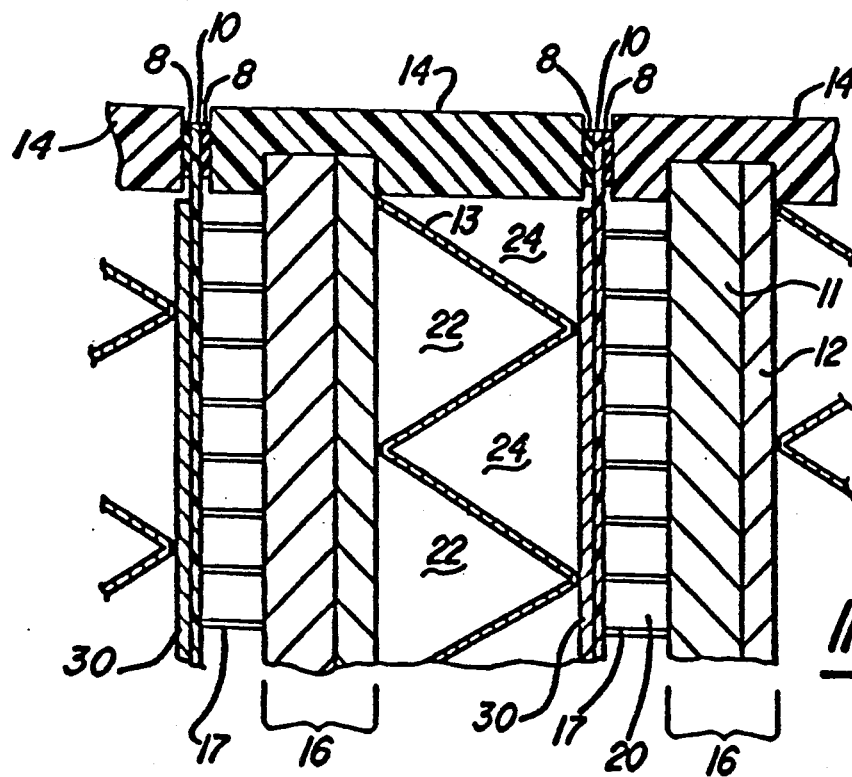
FIG. 2 is a schematic view of another embodiment of a bipolar cell according to the invention having a solid polymer catalytic anode material deposited on the cell membrane.

Referring to FIG. 2 in which another embodiment of the invention is schematically illustrated, a portion of a unit of a bipolar electrochemical cell is shown having a permselective membrane 10 with a catalytic anode coating 30 on said membrane, thus eliminating the need for the structural anode 15 shown in FIG. 1. It is noted that the same structures in the several figures representing embodiments of the invention are designated by the same numbers.

In the bipolar electrochemical cell of the invention, a novel means of providing an electrical connection between adjacent cell units of the bipolar electrochemical cell is disclosed. The electrical connection between cell units serves also as a means of providing channels for the feeding of gases in the use of the bipolar cell as a fuel cell or in an electrolytic cell as a means of feeding a depolarizing gas to a gas depolarized electrode and the collection of gas as well as the circulation of electrolyte to a second electrode of the cell.

More particularly, when the electrochemical cell of the invention is utilized in the production of chlorine and an aqueous solution of sodium hydroxide, a depolarized cathode is utilized preferably in combination with a foraminous, dimensionally stable, metal anode. Thus an oxygen-containing gas is circulated through said channels formed with the cathode. The adjacent separate channels formed by the corrugated metal sheet in conjunction with the anode of the adjacent cell unit are utilized for the circulation of anolyte and for the collection and subsequent removal of chlorine gas formed at the anode. In conjunction with the gas depolarized cathode utilized in the bipolar cell of the invention, a non-conductive spacing or support means is used, such as a series of rod shaped members made of a material such as a plastic. The spacer is used in order to maintain a uniform dimension with the permselective membrane over the entire plane of the gas depolarized cathode and to provide pressure points, for good electrical contact, upon compression of the cell units with opposing corrugations of the corrugated connecting means. Use of the non-conductive spacing means also insures that the oxygen containing gas pressure maintained upon the side of the electrode opposite to that exposed to electrolyte does not change the electrode dimension relative to the opposite electrode.

An electrochemical cell is defined in this specification and claims as including (1) electrolytic cells, particularly those for the electrolysis of an alkali metal halide, and (2) fuel cells such as those cells used for the direct production of electrical current from a fuel and oxidant which cells employ an oxidizing electrode, a fuel electrode, and an electrolyte, particularly a liquid electrolyte. For convenience, the invention will be disclosed in connection with its use in an electrolytic cell. One skilled in this art will be able to utilize the disclosed means of making and maintaining electrical contact between adjacent cell units of a bipolar electrolytic cell in any electrochemical cell.

The present invention is based upon the discovery of a novel means of making electrical contact between the individual cell units of a bipolar electrochemical cell. By utilizing a conductive means such as a corrugated metal sheet to connect the cathode and anode of adjacent bipolar cell units, a series of channels is formed, said channels serving, in the case of fuel cells as a means of providing a fuel gas to one side of the electrode while the opposite side of the electrode is exposed to an electrolyte. In the case of an electrolytic cell, for instance, for the production of chlorine and an aqueous solution of sodium hydroxide, the series of channels adjacent to the cathode is utilized to provide said cathode with air or an oxygen containing gas so as to depolarize the cathode and prevent the formation of hydrogen at the cathode. The channels adjacent to the anode which are formed by the corrugated metal sheet are utilized as a means of providing anolyte to said anode and as a means of removing chlorine gas formed at said anode. Implicit in the proper functioning of said channels is the use of a foraminous anode, preferably a dimensionally stable anode or a porous anode such as a gas diffusion anode.

The novel bipolar electrochemical cell of the invention comprises a plurality of cells each cell unit having a cell body containing, as electrodes, an anode and a cathode; a cell separator, i.e., a cell membrane, an electrically non-conductive spacing means interposed between said cell separator and at least one of said electrodes; and means for electrically connecting said anode and said cathode comprising a corrugated metal or graphite sheet. Where it is required to collect a gas evolved at one of the electrodes of the cell, it is preferred that the major dimension of the electrodes and the corrugations of said metal sheet forming said channels lie in a substantially vertical plane so as to allow collection of said gas in said channels. Where the bipolar cell is utilized as a fuel cell or where there are no gaseous products to be collected in an electrolysis process in which the bipolar cell is utilized, the major dimension of the electrodes and the corrugations forming said channels need not lie in a substantially vertical plane.

More specifically, this invention relates to a novel bipolar assembly comprising an (a) a cell separator which can be an electrolyte permeable diaphragm or an ion-permeable permselective membrane located between the two electrodes, i.e., the anode and the cathode of the individual cell unit of the bipolar cell of the invention; (b) a non-conductive spacing means interposed between said cell separator and at least one of said electrodes so as to provide the required pressure points for good electrical contact and to maintain a required spaced relationship between a gas diffusion cathode and the adjacent anode; and (c) means for electrically connecting anode and cathode electrodes of adjacent cells comprising a corugated metal or graphite sheet having corrugations defining, in conjunction with one electrode, a cathode, a first series of channels and defining, in conjunction with a second electrode, an anode, a second series of channels wherein said channels are utilized to feed at least one of a gas or liquid to said electrodes. An anolyte zone is located between said cell separator, i.e., permselective membrane and said anode where a structural anode is utilized and an anolyte zone is provided on the opposite side of said anode within the channels formed by the corrugated metal sheet which functions also as a means of electrical connection between adjacent cell units of said bipolar cell. The anolyte zone is restricted to the channels formed by the corrugated metal sheet which forms the electrical connection between adjacent cell units of the bipolar cell where a catalytic anode coating is utilized on the anolyte zone side of the cell separator, i.e., permselective membrane. A means for recovering the products of electrolysis is provided where the bipolar cell is utilized in a process for electrolysis rather than as a fuel cell.

The electrochemical bipolar cell of this invention can have several configurations. According to one embodiment, a gas diffusion cathode and gas diffusion anode are utilized where the bipolar electrochemical cell unit is utilized as a fuel cell. Where the electrochemical bipolar cell of the invention is utilized in an electrolysis process, the cell unit can contain a gas diffusion cathode while the anode of the cell can be either a gas diffusion anode or a dimensionally stable, foraminous anode. In another embodiment of the electrochemical cell of the invention, where such cells are utilized in an electrolytic process, the anode rather than being a foraminous, dimensionally stable anode can be a catalytic anode coating on the permselective membrane of the cell so that together they constitute an integral unit.

In the preferred embodiments of the bipolar electrochemical cell of the invention, catholyte is fed to the cell so as to provide a continuously flowing film or layer over the catalytically active surface of the gas diffusion cathode. At the same time air or other oxygen containing gas is brought into contact with the opposite surface of said cathode so as to depolarize the cathode and thereby eliminate any substantial formation of hydrogen gas.

Critical to the operation of the bipolar cell of the invention are the substantially triangular or sine wave configuration channels formed by the electrically conductive corrugated metal or graphite or a metal and graphite composite sheet forming the electrical connection between adjacent cell units of the bipolar cell of the invention. The substantially triangular or sine wave configuration channels can be formed of a titanium sheet with a thickness in the range of 0.1 to 1 millimeter. Other electrochemically resistant metals can be used in place of titanium. Where the bipolar cell of the invention is utilized in an electrolytic process, the channels preferably extend vertically for substantially the entire height of the major dimension of the electrodes of the cell unit. Generally the channels are uniformly positioned apart from each other and from the channels formed on the opposite side of the titanium sheet for the entire height of the electrode compartment.

The distance between said channels is determined by the degree of electrical contact necessary for the electrically conductive corrugated sheet with the electrode of the cell. Current distribution is favored by electrical connection at more frequent intervals than at more widely dispersed intervals. A desirable distance between connections is about 2 to about 15 mm where a metal sheet is used and about 2 to about 6 mm where a graphite sheet is used. The distance required between the points of contact made by the corrugated metal or graphite sheet with the electrode also depends upon the conductivity of the electrode material which can be greatly increased by the incorporation of a foraminous metal sheet in the conductive backing. If the conductivity of the electrode is increased, the distance between contact points can be increased. The depth and shape of the channels also depend upon the current density required in the operation of the cell. In addition, if gas evolution occurs at the electrode, there must be space for disengagement from the electrolyte of the gas produced. If the bipolar cell is operated at high depolarizing gas pressures in combination with recirculation of anolyte, the channel adjacent to the anode can be made small. The angles between the catholyte channels formed by the corrugated metal connecting means determine the compression points for contact with the electrodes. Ease of separation of the gas formed at the electrode from the liquid electrolyte which is in contact with said electrode must also be considered in determining the optimum angle to be provided between the various channels.

The anode can be a screen or expanded sheet of titanium or other valve metal suitably coated with a catalytic layer of chemically resistant, non-passavatable material. Suitable anodic coatings can be formed from platinum-group metal oxides, conductive mixed oxides of non-noble metals, for example, spinels, etc. The anode can also be a gas diffusion anode formed of a carbon or graphite particulate material bonded with a polymer, preferably a halogenated polymer as more particularly described below in connection with the cathode construction.

Generally the cathode utilized in the cell is formed of a carbon or graphite particulate material bonded with a polymer, preferably a halogenated polymer. The cathode can be of a homogeneous construction or it can be laminar cathode having an electrochemically active hydrophilic layer containing, for instance, a conductive carbon bonded with a polymeric binder, said layer bonded to a conductive hydrophobic backing layer. Generally both layers of the electrode are porous. The conductive hydrophobic backing layer preferably comprises a hydrophobic polymer, a conductive carbon, and a foraminous metal sheet such as an expanded metal or a metal mesh. The hydrophobic polymer is preferably a thermoplastic halocarbon polymer. The polymeric binder in the hydrophilic layer is preferably a thermoplastic halocarbon polymer. In either case whether the cathode is homogeneous or heterogeneous and composed of two or more layers, the cathode must be electrically conductive throughout so that an electrical connection is provided through the cathode to the catalytically active, hydrophilic surface of the electrode, thus electrically activating the catalytically active portion of the cathode. Preferably the backing layer has a foraminous metal pressed into the layer in order to provide greater electrical conductivity in the electrode in a direction parallel to the face of the electrode. The foraminous metal can be made of nickel or silver plated nickel.

While polytetrafluoroethylene is the most preferred polymer for use in the preparation of the electrically non-conductive spacing means and the electrodes of the invention, if desired, other polymers can be used such as the thermoplastic halocarbon polymers selected from the group consisting of at least one of polymers of tetrafluoroethylene, fluorinated ethylene propylene, copolymers thereof having the moieties $(-CX_1X_2-CX_3CX_4-)$, $(-CY_1Y_2-CY_3Y_4-)$, and homopolymers having the moieties $(-CY_1Y_2-CY_3F-)$ wherein $X_1$, $X_2$, $X_3$, $X_4$, $Y_1$, $Y_2$, $Y_3$, and $Y_4$ are selected from the group consisting of fluorine, chlorine, and hydrogen, at least one of said X and Y being fluorine. Preferably the halocarbon polymer forming the electrodes and spacing means is a fluorocarbon polymer selected from the group consisting of at least one of copolymers having an ethylene moiety and a fluorocarbon moiety chosen from the group consisting of $(-CFH-CH_2-)$, $(-CF_2-CH_2)$, $(-CF_2-CFH-)$, $(-CF_2-CF_2-)$, and $(-CH_2-CClF-)$.

Suitable hydrophobic polymers can generally include any polymer having a low surface energy which will remain stable under fuel cell or chlor-alkali electrolysis cell operating conditions. Such polymers include polymers of various halogen-substituted hydrocarbon monomers, particularly fluorine-substituted oleofinic monomers. Halogen-containing polymers that can be employed include polymers of fluorocarbons and substituted fluorocarbons wherein one or more fluorine atoms are replaced by hydrogen, chlorine, or bromine. Alternative halocarbon polymers include polytrifluoroethylene, polyvinylfluoride, polyvinylidene fluoride, polytrifluorochloroethylene, and copolymers of different fluorocarbon monomers such as copolymers of tetrafluoroethylene and hexafluoropropylen.

In addition to the halocarbon polymers, various other hydrophobic polymers which can be used include hydrocarbon polymers having a molecular weight of 50,000 to 1,000,000 or more, and a free surface energy close to or below that of polyethylene. Representative polymers include polymers and copolymers of ethylene, propylene, 3-ethyl-1-butene, 4-methyl-1-pentene, and 4,4-dimethyl-1-pentene.

The conductive carbon utilized in the formation of the hydrophilic layer of the gas diffusion electrodes utilized can be an electrically conductive, hydrophilic carbon. For instance, acetylene black having a small particle size which is electrically conductive can be used. Certain other carbon blacks such as furnace black are also electrically conductive and can be used. The carbon used can be porous or non-porous. Generally, carbon blacks having a particulate size ranging from about 0.01 to about 0.05 microns, and more usually within the range of about 0.01 to 0.03 microns are suitable. The carbon black generally is admixed with at least one electrochemically active catalyst. The catalyst can also be added as a separate component. Carbon black is available commercially containing 5 to 10 percent by weight of an electrochemically active catalyst, such as silver, dispersed throughout the carbon black.

As an electrochemically active catalyst for use as a component of the cathode in a chlor-alkali electrolysis cell, a supported precious metal catalyst such as silver, platinum, palladium, rhodium, and the like (Group VIII of the periodic table, periods 5 and 6) or metal oxides such as combinations of nickel oxide and lithium oxide can be used. Where the electrode is utilized as an anode in a fuel cell, metals of Groups I-B, V-B, VI-B, and VIII of the periodic table can be used. For instance, chromium, tungsten, molybdenum, cobalt, nickel, silver, copper, platinum, palladium, rhodium, iridium, and other metals such as manganese and inorganic compounds containing one or more of such metals such as nickel oxide, manganese oxide, cobalt molybdate, vanadium pentoxide, and the like can be used. Platinum is especially active as an anode catalyst.

The cell separator is preferably an ion exchange permselective membrane, such as a cation-exchange membrane. Other types of cell separators, such as the electrolyte permeable diaphragms of the prior art, for instance, asbestos diaphragms can be used. The cell separator is utilized in each bipolar cell unit between the anode and cathode of said cell unit. Cation-exchange permselective membranes are particularly suitable for electrolysis of alkali metal halide brines to produce alkali metal hydroxides and halogen. Anion-exchange membranes can be used for other processes instead of cation-exchange membranes. Examples of cation-exchange membranes are those formed from organic resins, for instance, phenol-formaldehyde resins or resins obtained by polymerization of styrene and/or divinylbenzene, fluorocarbon resins, polysulphones, or polymethacrylic or phenoxy resins, with cation-exchanging radicals such as $-SO_3H, -COOH, -PO_2H_2, -PO_3H_2$. Such resins also can be employed as mixed polymers or copolymers, for example, fluorocarbon resins can contain substituted or unsubstituted alkoxy groups and contain elements such as sulphur, nitrogen, and oxygen. Generally, resins with sulphonic groups are preferred, and among these polyfluorocarbon resins which contain cation-exchange groups and are copolymers of tetrafluoroethylene with $CF_2=CF-OCF_2CF_2SO_3H$, or other corresponding acidic polymerizable fluorocarbon. Preferably, the polyfluorocarbon is at least one of a polymer of perfluorosulphonic acid, a polymer of perfluorocarboxylic acid, and copolymers thereof. These copolymers have equivalent weights of about 900 to about 1800 and are characterized by long fluorocarbon chains with various acidic groups including sulphonic, phosphonic, sulphonamide, or carboxylic groups or alkali metal salts of said groups attached thereto.

The electrically non-conductive spacing means utilized between the gas depolarized cathode and the permselective membrane of the cell unit is essential for the operation of the gas depolarized cathode. Generally it can be formed of a foraminous, thermoplastic material or a series of elongated rod shaped members. The rod shaped members can be integrally formed or discrete members. The rod shaped members, whether discrete or integrally formed, are positioned at an angle to the line formed by the ridge of the electrically conductive corrugated connector. This angle is generally at least about 10°, preferably about 30° to about 50° and can be a maximum angle of about 80°. The thermoplastic halocarbon polymers, which are resistant to the conditions within the cell, are useful materials of construction for the spacing means. The thermoplastic halocarbon polymers disclosed as useful in the preparation of the gas diffusion electrodes can be used to form the spacing means. Polytetrafluoroethylene is a suitable specific material of which to make the spacing means. Preferably the spacing means should be formed with an open network which is suitable for directing catholyte flow across the gas diffusion cathode surface and be sufficiently inflexible to promote a good compression contact between the opposite surface of the gas depolarized cathode and the corrugated metal sheet which provides electrical contact upon compression of the cell stack between the gas depolarized cathode and the anode of the adjacent cell unit.

The bipolar electrochemical cell of the invention is preferably of the so called filter-press arrangement. This cell arrangement has become the preferred form for bipolar electrolytic cells having a permselective membrane as the result of the development of dimensionally stable materials of construction including dimensionally stable cell frames and dimensionally stable anodes for use in said cells. The filter press electrolytic cell frame can be made of a plastic material which is resistant to the cell environment such as polypropylene. Preferably the permselective membrane is made co-planar with the frame seal surfaces and the interelectrode gap. The distance of the cathode from the permselective membrane is determined by the nonconductive spacing means. Each cell frame is provided with the necessary inlet and outlet ports for the electrolytes as well as inlet and outlet ports, where required, for feeding gas to the gas diffusion electrodes or withdrawing gas from electrodes at which a gas is produced. These inlet and outlet ports can be suitably obtained by drilling holes through the frame wall. Compression, such as by mechanical means, of the cell stack is necessary to make all electrical contacts.

In the operation of the bipolar electrochemical cell of the invention, current passes through the whole series of elementary cells from the anodic terminal element, across each bipolar element from the gas diffusion cathode of a bipolar cell unit through the corrugated metal sheet which provides electrical connection between cell units to the foraminous dimensionally stable anode of the adjacent cell unit (or alternately through a gas diffusion anode) through the electrolyte, and across the permselective membrane to the gas diffusion cathode, etc. to the cathode terminal element of the bipolar electrochemical cell. In the case of an electrolysis process for the production of an aqueous solution of sodium hydroxide and chlorine gas, the chlorine gas is evolved at the anode in the form of tiny bubbles passing through the foraminous anode and rising with the flow of anolyte brine for collection above the surface of the anolyte at the top of the cell or in an external compartment used for degassing. Sodium ions migrate across the permselective membrane and reach the surface of the gas diffusion cathode where they combine with hydroxyl ions generated by the cathodic reduction of oxygen and water to form sodium hydroxide. The hydrogen normally evolved at the cathode is prevented from being formed by the presence of an oxygen containing gas which is fed to the side opposite to that exposed to the electrolyte of the gas depolarized cathode. Concentrated brine is fed to each unit of the bipolar electrochemical cell usually through an inlet located at the bottom of the anode compartment and recirculated within the cell. Concentration gradients are thereby prevented from occuring while promoting a more uniform reaction over the anode surface. The bipolar elements of the electrochemical cell of the invention are assembled by means of tie-rods or hydraulic or pneumatic jacks between two monopoler terminal anodic and cathodic elements.

Where not otherwise specified throughout this specification and claims, temperatures are given in degrees centigrade, and parts, percentages, and proportions are by weight. While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illumination which do not constitute departures from the spirit and scope of the invention.

The embodiments of the invention in which an exclusive property or priviledge is claimed are defined as follows:

1. A bipolar assembly for a bipolar electrochemical cell comprising:
   (a) anode and cathode electrodes, at least one of which is a gas diffusion electrode,
   (b) a cell separator adjacent to said anode,
   (c) an electrically non-conductive spacing means adjacent to said cathode, and
   (d) means for electrically connecting said electrodes consisting of a corrugated, electrically conductive sheet having corrugations defining, in conjunction with said cathode, at least one first channel and defining, in conjunction with said anode, at least one second channel, said channels utilized to feed one or more gases or liquids to said electrodes.

2. The bipolar assembly of claim 1 wherein said cathode is a gas diffusion cathode, said anode is a foraminous, dimensionally stable anode and said electrically conductive sheet is selected from the group consisting of a metal sheet, a graphite sheet, and a metal and graphite composite sheet.

3. The bipolar assembly of claim 2 wherein said cell separator is a permselective membrane, said spacing means is a foraminous thermoplastic material or a series of discrete or integrally formed rod shaped members, and said cell is an electrolytic cell.

4. The bipolar assembly of claim 3 wherein said first series of channels defined by said means for electrically connecting said anode and said cathode provides a means of feeding air or an oxygen containing gas to said gas diffusion cathode.

5. The bipolar assembly of claim 4 wherein said second series of channels defined by said means for electrically connecting said anode and said cathode provides a means for feeding an anolyte liquid electrolyte to said anode.

6. The bipolar assembly of claim 5 wherein said electrolytic cell is for the electrolysis of an alkali metal halide, said cathode and said anode each have their major dimension lying in a substantially vertical plane, and said corrugated, electrically conductive connecting means has corrugations extending substantially vertically.

7. A means for electrically connecting an anode and an adjacent cathode in a bipolar electrochemical cell, said means consisting of a corrugated, electrically conductive sheet adapted for forming, in conjunction with said cathode, at least one first channel and forming, in conjunction with said anode, at least one second channel, wherein said electrically conductive sheet is selected from the group consisting of a metal sheet, a graphite sheet, and a metal and graphite composite sheet, said anode is a foraminous, dimensionally stable anode, and said cathode is a gas diffusion cathode wherein during operation of said cell, a depolarizing gas is fed through said first channel and an anolyte liquid electrolyte is fed through said second channel and gas formed on said anode is removed thereby.

8. The means of claim 7 wherein said first channel is adapted for feeding an oxygen containing gas to said gas diffusion cathode and wherein said second channel is adapted for feeding an aqueous solution of an alkali metal halide and the collection of a halogen gas.

9. A bipolar electrochemical cell having a plurality of cell units, each cell unit comprising:
   (a) a cell body containing as electrodes an anode and a cathode,
   (b) a cell separator, electrolyte, and an electrically non-conductive spacing means separating at least one of said electrodes from said separator at least one of said electrodes being a gas diffusion electrode, and
   (c) means for electrically connecting said anode and said cathode respectively with a cathode and an anode of adjacent cell units of said bipolar electrochemical cell consisting of a corrugated, electrically conductive sheet.

10. The bipolar electrochemical cell of claim 9 wherein said anode is a foraminous, dimensionally stable anode; said cathode is a gas depolarized cathode; the major dimension of said anode and said cathode extends in a substantially vertical plane; said cell separator is a cation exchange permselective membrane; and said corrugated, electrically conductive sheet is selected from the group consisting of a metal sheet, and said electrically conductive sheet is selected from the group consisting of a metal sheet, a graphite sheet, and a metal and graphite composite sheet.

11. The bipolar electrochemical cell of claim 10 wherein said spacing means is a foraminous, thermoplastic material or a series of discrete or integrally formed rod shaped members.

12. The bipolar electrochemical cell of claim 11 wherein said spacing means is a thermoplastic halocarbon polymer selected from the group consisting of at least one of polymers of tetrafluoroethylene, fluorinated ethylene propylene, copolymers thereof having the moieties

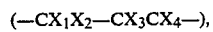

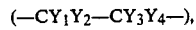

and homopolymers having the moieties

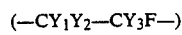

wherein $X_1$, $X_2$, $X_3$, $X_4$, $Y_1$, $Y_2$, $Y_3$, and $Y_4$ are selected from the group consisting of fluorine, chlorine and hydrogen, at least one of said X and Y being fluorine.

13. The bipolar electrochemical cell of claim 12 wherein said spacing means comprises a fluorocarbon polymer selected from the group consisting of at least one of copolymers having an ethylene moiety and a fluorocarbon moiety chosen from the group consisting of

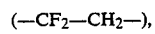

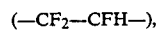

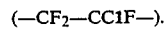

14. The bipolar electrochemical cell of claim 13 wherein said spacing means is a fluorocarbon polymer consisting of polytetrafluoroethylene.

15. A method for operating an electrochemical cell as a fuel cell or for the electrolysis of an aqueous solution of an alkali metal halide, said cell comprising: a cell body, an anode, a cathode, a cell separator, electrolyte, and an electrically non-conductive spacing means interposed between said cathode and said cell separator; said cell being adapted for use as a unit of a bipolar electrochemical cell wherein the means for electrically connecting an anode of one cell to a cathode of an adjacent cell consists of:

a corrugated electrically conductive sheet interposed between said cathode of one cell and said anode of an adjacent cell wherein said corrugated, electrically conductive sheet defines, in conjunction with said cathode, a first channel and said corrugated electrically conductive sheet defines, in conjunction with said anode, a second channel, said method comprising the steps of:
(a) supplying a fuel gas or a depolarizing gas through said first channel to said cathode, and
(b) supplying a fuel gas or an aqueous solution of an alkali metal halide through said second channel to said anode and removing gas generated at said anode.

16. The method of claim 15 wherein said alkali metal halide is sodium chloride, said cathode is a gas depolarized cathode, said corrugated, electrically conductive sheet is selected from the group consisting of a metal sheet, a graphite sheet, and a metal and graphite composite sheet, said spacing means is a foraminous thermoplastic material or a series of discrete or integrally formed rod shaped members, and said anode is a foraminous, dimensionally stable anode.

17. The method of claim 16 wherein said depolarizing gas fed to said gas depolarized cathode is an oxygen containing gas.

* * * * *

UNITED STATES PATENT AND TRADEMARK OFFICE
CERTIFICATE OF CORRECTION

PATENT NO. : 4,755,272
DATED : July 5, 1988
INVENTOR(S) : Keith R. Plowman

It is certified that error appears in the above-identified patent and that said Letters Patent is hereby corrected as shown below:

Col. 2, line 7, "platium" should read -- platinum --;
line 33, "fist" should read -- first --.

Col. 6, line 45, "electrode" should read -- electrodes --.

Col. 10, line 57, "monopoler" should read -- monopolar --.

Col. 10, line 68-Col. 11, line 1, "illumination" should read
-- illustration --.

Signed and Sealed this

Sixth Day of December, 1988

Attest:

DONALD J. QUIGG

*Attesting Officer*  *Commissioner of Patents and Trademarks*